United States Patent
Kataoka (12)

(10) Patent No.: US 6,167,873 B1
(45) Date of Patent: Jan. 2, 2001

(54) APPARATUS FOR CONTROLLING EGR VALVE OF DIESEL ENGINE AND METHOD

(75) Inventor: Hideki Kataoka, Kanagawa-ken (JP)

(73) Assignee: Nissan Motor Co., Ltd., Yokohama (JP)

( * ) Notice: Under 35 U.S.C. 154(b), the term of this patent shall be extended for 0 days.

(21) Appl. No.: 09/348,470

(22) Filed: Jul. 7, 1999

(30) Foreign Application Priority Data

Jul. 7, 1998 (JP) .................................................. 10-191998

(51) Int. Cl.$^7$ .............................. F02M 25/07; H02P 8/00
(52) U.S. Cl. .............................. 123/563.24; 251/129.11; 318/696
(58) Field of Search .................. 123/568.21, 568.24; 318/696; 251/129.11, 129.12

(56) References Cited

U.S. PATENT DOCUMENTS

| | | | | |
|---|---|---|---|---|
| 4,674,464 | * | 6/1987 | Akagi ............................... | 123/568.24 |
| 5,579,743 | * | 12/1996 | Kadowaki ....................... | 123/568.24 |
| 5,769,390 | * | 6/1998 | Ando ............................... | 251/129.11 |

FOREIGN PATENT DOCUMENTS

| | | |
|---|---|---|
| 8-51795 | 2/1996 | (JP) . |
| 08 109855 | * 4/1996 | (JP) . |

* cited by examiner

Primary Examiner—Henry C. Yuen
Assistant Examiner—Arnold Castro
(74) Attorney, Agent, or Firm—Foley & Lardner

(57) ABSTRACT

A disclosed apparatus and method controls an EGR valve including a valve body, a valve seat, and a step motor that fully closes the EGR passage by moving the valve body to abut onto the valve seat and that opens the EGR passage by moving the valve body away from the valve seat. This valve body is located on a side of the exhaust passage as viewed from the valve seat. A determination is made of whether the voltage of a battery connected to the step motor is relatively low, whether the temperature of a cooling water of the diesel engine is relatively high, and whether the exhaust gas pressure of the diesel engine is at a relatively high level. When it is determined that the voltage of the battery is relatively low, and/or it is determined that the temperature of the cooling water of the diesel engine is relatively high, and it is determined that the exhaust gas pressure of the diesel engine is at the relatively high level, the EGR valve is forcedly fully closed.

7 Claims, 3 Drawing Sheets

APPARATUS FOR CONTROLLING EGR VALVE OF DIESEL ENGINE AND METHOD

BACKGROUND OF THE INVENTION

The present invention relates to an apparatus for controlling an EGR (Exhaust Gas Recirculation) valve of a diesel engine and a method for controlling an EGR valve of a diesel engine, more particularly, to such an apparatus and such a method that are intended to prevent a so-called "step out" from occurring in a step motor type EGR valve.

Conventionally, to an EGR passage for recirculating a part of the exhaust gas in the exhaust passage of a diesel engine into the inlet passage thereof, there is one which is provided with an EGR valve that is driven to be opened and closed by the drive force from a step motor according to the operational conditions of the diesel engine.

Also, Japanese Patent Application Laid-Open No. H8-51795 discloses a construction that stops the drive of the step motor when there is the likelihood that a so-called "step out" will occur in this step motor.

SUMMARY OF THE INVENTION

According to the studies made by the present inventor, especially when it is constructed in such a manner that such an EGR valve is disposed on a side of exhaust passage as viewed from a valve seat thereof, it sometimes happens that when the drive force applied from the step motor to a valve body of the EGR valve decreases in correspondence with a decrease in the drive current to the step motor, or particularly a coil current thereof, the valve body becomes unable to resist the exhaust gas pressure applied to this valve body in the valve closing direction. And in such a case, there is a case where the step out occurs in the step motor. Once the step out occurs in the step motor, it becomes difficult to control the valve body as preset. For example, it is considered that the degree of opening of the EGR valve becomes smaller than a preset one, the EGR valve becomes fully closed before it should be brought to such a fully closed state, etc.

Accordingly, a new configuration of the EGR valve is required in which the step out is prevented in the step motor.

However, for example, in a case that a configuration where devices, circuits or the like for detecting the coil current supplied to the step motor is provided and thereby the drive of the step motor is stopped when the coil current decrease is detected, it becomes necessary as a matter of course to provide a detector for detecting the coil current, with the result that the configuration becomes complicated and the cost also increases.

Also, in the case of a configuration where the coil current is detected in this way, it is surely convenient that such the configuration is of a type wherein when the valve of the coil current is smaller than a predetermined value, the drive of the EGR valve is equally stopped to thereby fully close this EGR valve. However, since the EGR flow is forcedly stopped equally, the discharged amount of NOx in the exhaust gas increases. This phenomenon is still more prominent when the exhaust pressure is at a high level.

In addition, as a configuration for preventing the step out in the step motor, there is considered a configuration that makes the valve diameter of the EGR valve small and thereby decreasing the pressure-receiving area thereof for receiving the pressure of the exhaust gas, a configuration that uses a step motor whose drive force is large in magnitude, or the like. However, the former configuration cannot sufficiently answer the request of effectively purifying the exhaust gas by the EGR flow. The latter construction inconveniently leads to the increase in the occupation area due to the increase in size of the step motor and to the increase in cost. Therefore, any of these configurations can not become a decisive one.

The present invention has been made as a result of the above-described studies made by the present inventor and has an object to provide an apparatus for controlling the EGR valve of a diesel engine and a method for the same, which basically eliminate the necessity of installing additional detectors, namely, only uses conventionally existing detectors, and which effectively abate the forced stop of the EGR flow and can prevent the step out in the step motor type EGR valve.

To attain the above object, an apparatus for controlling an EGR valve of a diesel engine, according to the present invention, has an object to be controlled, that is, an EGR valve provided in an EGR passage for recirculating a part of the exhaust gas in an exhaust passage of the diesel engine to return its flow to an inlet passage thereof. The EGR valve includes a valve body, a valve seat, and a step motor that fully closes the EGR passage by moving the valve body so as to abut to the valve seat and that opens the EGR passage by moving the valve body away from the valve seat, and the valve body is located on a side of the exhaust passage as viewed from the valve seat. Here, the apparatus for controlling an EGR valve of a diesel engine according to the present invention comprises a battery voltage determining section determining whether the voltage of a battery connected to the step motor is not higher in level than a predetermined voltage, a water temperature determining section determining whether the temperature of a cooling water of the diesel engine is not lower than a predetermined temperature, an exhaust gas pressure determining section determining whether the exhaust gas pressure of the diesel engine is at a level corresponding to a predetermined pressure or at a level corresponding to a pressure higher than the predetermined pressure, and a forcedly fully closing section that forcedly fully closes the EGR valve when it is determined in the battery voltage determining section that the voltage of the battery is not higher than the predetermined voltage, and/or it is determined in the water temperature determining section that the temperature of the cooling water of the diesel engine is not lower than the predetermined temperature, and it is determined in the exhaust gas pressure determining section that the exhaust gas pressure of the diesel engine is at the level corresponding to a predetermined pressure or at the level corresponding to a pressure higher than the predetermined pressure.

In other words, the apparatus for controlling an EGR valve of a diesel engine according to the present invention comprises battery voltage determining means determining whether the voltage of a battery connected to the step motor is relatively low, water temperature determining means determining whether the temperature of a cooling water of the diesel engine is relatively high, exhaust gas pressure determining means determining whether the exhaust gas pressure of the diesel engine is at a relatively high level, and forcedly fully closing means that forcedly fully closes the EGR valve when it is determined in the battery voltage determining means that the voltage of the battery is relatively low, and/or it is determined in the water temperature determining means that the temperature of the cooling water of the diesel engine is relatively high, and it is determined in the exhaust gas pressure determining means that the exhaust gas pressure of the diesel engine is at the relatively high level.

In the meanwhile, a method for controlling an EGR valve of a diesel engine according to the present invention has the same EGR valve as an object to be controlled, and comprises the steps of determining whether the voltage of the battery connected to the step motor is relatively low, determining whether the temperature of a cooling water of the diesel engine is relatively high, determining whether the exhaust gas pressure of the diesel engine is at the relatively high level, and forcedly fully closing the EGR valve when it is determined that the voltage of the battery is relatively low, and/or it is determined that the temperature of the cooling water of the diesel engine is relatively high, and it is determined that the exhaust gas pressure of the diesel engine is at the relatively high level.

DETAILED DESCRIPTION OF THE PREFERRED EMBODIMENT

There will be detailed below a embodiment of the present invention with reference to the drawings.

Figure 1:
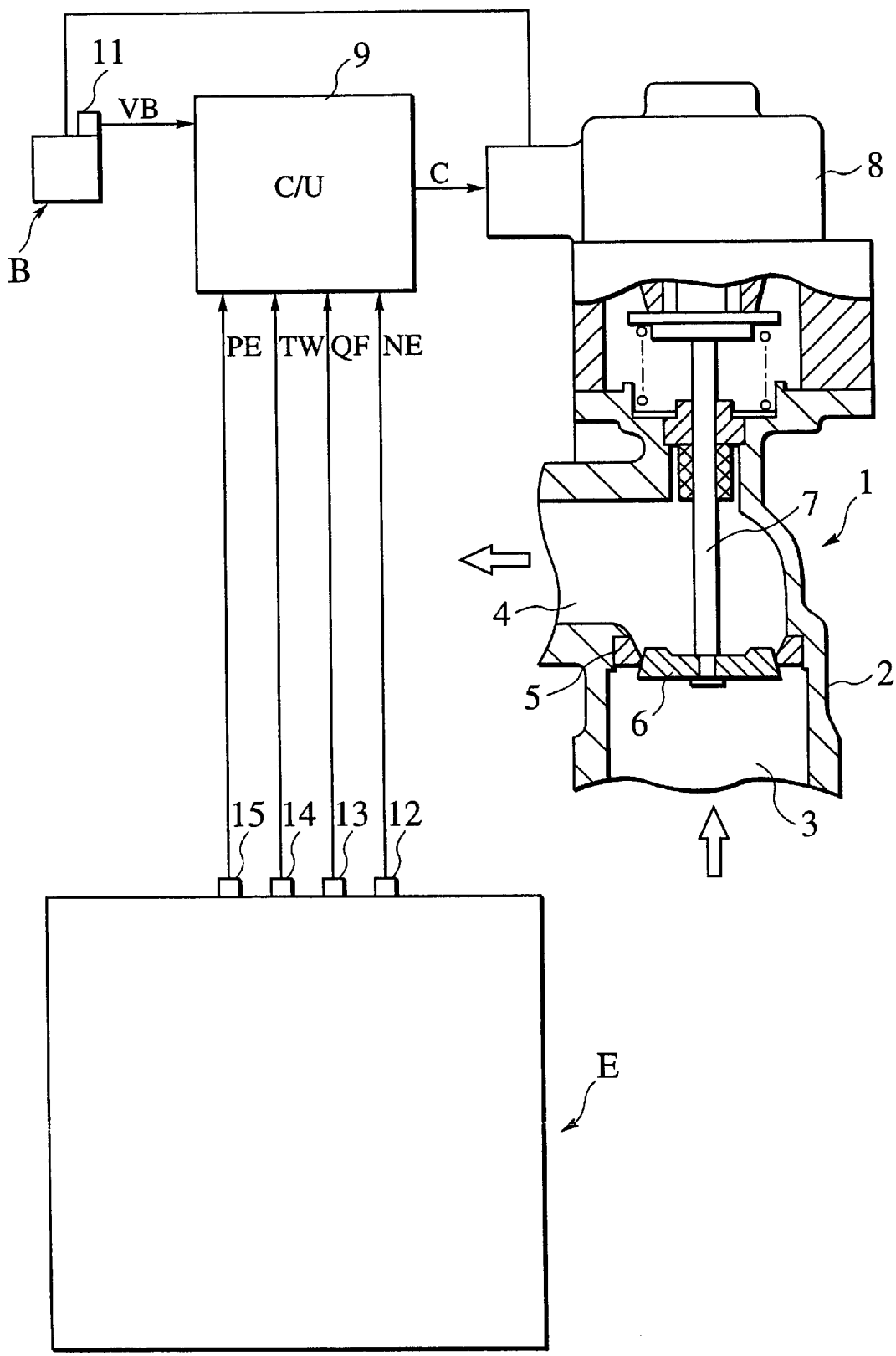
FIG. 1 shows a system diagram of an EGR valve to which an apparatus for controlling an EGR valve of a diesel engine and a method according to an embodiment of the present invention are applied.

First, an EGR valve 1, to which an apparatus for controlling an EGR valve of a diesel engine and a method for the same according to the embodiment of the present invention is applied, is provided with a housing 2 as understood by referring to FIG. 1 which showing its partial section and the EGR valve 1 is provided to an engine E.

Here, more specifically, the EGR valve 1 is communicated with each of an exhaust passage and inlet passage of the engine through an EGR piping. The housing 2 of the EGR valve 1 is provided with an EGR passage inlet portion 3 that is communicated with the EGR piping communicated with the exhaust passage of the engine E, an EGR passage outlet portion 4 that is communicated with the EGR piping communicated with the inlet passage of the engine E, a valve seat 5 that is disposed between the EGR passage inlet portion 3 and the EGR passage outlet portion 4, and the poppet type valve body 6 that can be abutted onto the valve seat 5. It is to be noted that the arrows in the figure represent the flow of the exhaust gas that is made through the EGR valve 1 and also noted that the exhaust passage the inlet passage and the EGR piping of the engine E are each of a general type and so their illustration has been omitted.

The valve body 6 is located on a side of the exhaust passage as viewed from the valve seat 5 and is fixed to one end of a valve rod 7, in the meanwhile the other end of the valve rod 7 is communicated with a step motor 8. By controlling the supply of the electricity from a battery B to the step motor 8, more specifically, by controlling the supply of the electricity to a coil of the step motor 8 that corresponds to the voltage VB of the battery B, the step motor 8 has its rotor reversibly rotated. The step motor 8 moves the valve rod 7 vertically in the figure through the operation of a feed screw mechanism corresponding to the rotation of this rotor. And by the valve rod 7 being moved in such a manner, the degree of opening of the valve body 6, i.e., the distance of the gap between the valve seat 5 and the valve body 6 is varied. The coil and rotor of the step motor 8 are each of a general type and so their illustration has been omitted.

An operating unit that controls the above-described operation of the step motor 8 is a control unit 9. The control unit 9 is provided with a microcomputer that performs calculation process as later described, a memory, and other, for example, necessary input/output ports or the like. And, to the control unit 9, there are input a signal that corresponds to a battery voltage VB that has been detected by a voltage sensor 11 provided to the battery B, a signal that corresponds to a rotations number NE of the engine E that is detected by a crank angle sensor that is a rotations number sensor 12 provided to the engine E, a signal that corresponds to an engine load applied to the engine E that is detected by a load sensor 13 provided to the engine E, a signal that corresponds to a water temperature TW of the cooling water of the engine E that is detected by a water sensor 14 provided to a cooling water passage of the engine E, and a signal that corresponds to an exhaust gas pressure PE that is detected by an exhaust pressure sensor 15 provided to the exhaust passage of the engine E.

Here, it is to be noted that the load with respect to the engine E is determined in correspondence with the injecting quantity of fuel QF and, as the load sensor 13, there is used a nozzle lift sensor provided to a fuel injection nozzle, not illustrated, of the engine E. Also, as later described, the detection of the exhaust gas pressure PE that is made by the exhaust gas pressure sensor 15 is not always necessary. Also, the signals that correspond to the various information items VB, NE, or the like respectively detected by corresponding sensors are shown in the figures by being denoted by the same reference symbols VB, NE, or the like.

And, the control unit 9 performs calculation process so as to control the EGR valve 1, according to such various kinds of signals, to thereby deliver a control signal C to the EGR valve 1.

Figure 2:
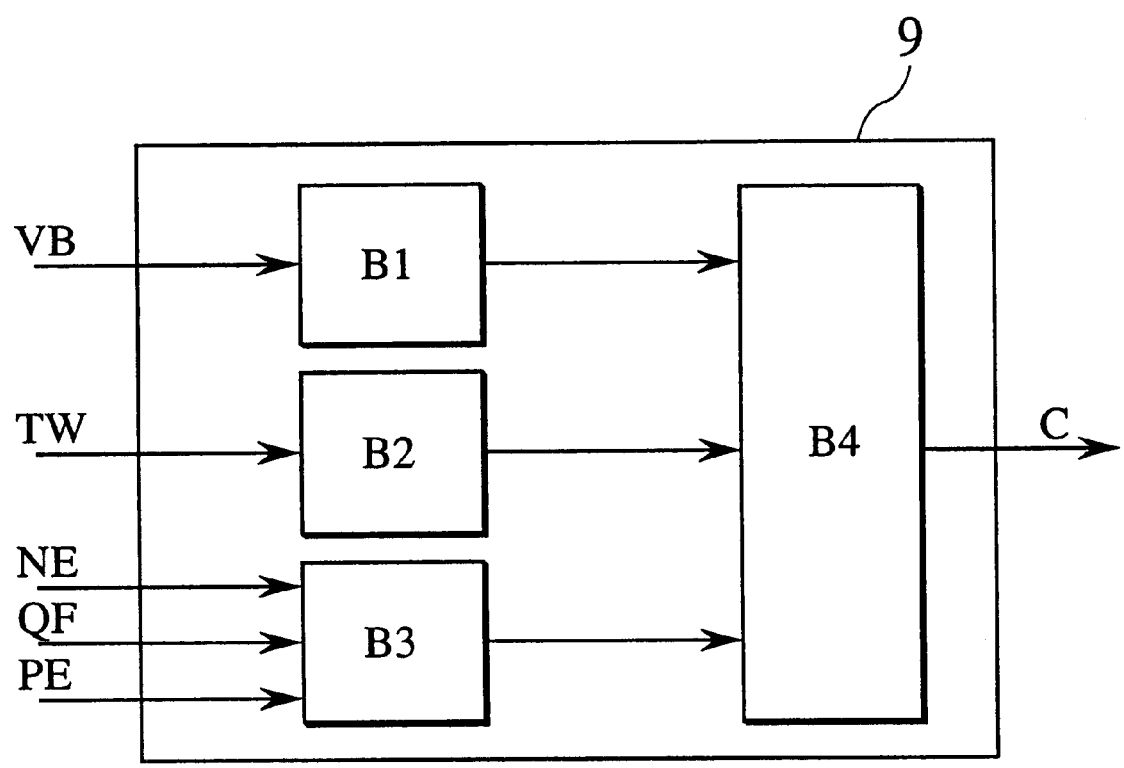
FIG. 2 shows a block diagram of a control unit according to the embodiment.

Here, as illustrated in detail in FIG. 2, the control unit 9 is provided with a battery voltage determining block B1 to which the signal corresponding to the battery voltage VB is input, a water temperature determining block B2 to which the corresponding to the water temperature TW of the cooling water is input, an exhaust gas pressure determining block B3 to which the signal corresponding to the engine rotations number NE, the signal corresponding to the injecting quantity of fuel QF, and, if the occasion demand, the signal corresponding to the exhaust gas pressure PE are input, and a forcedly fully closing block B4 that forcedly fully closes the EGR valve 1 upon receipt of the determination results from the determining blocks B1, B2 and B3. It is to be noted that a block that controls the EGR valve 1 at a normal control time is omitted in the figure.

Figure 3:
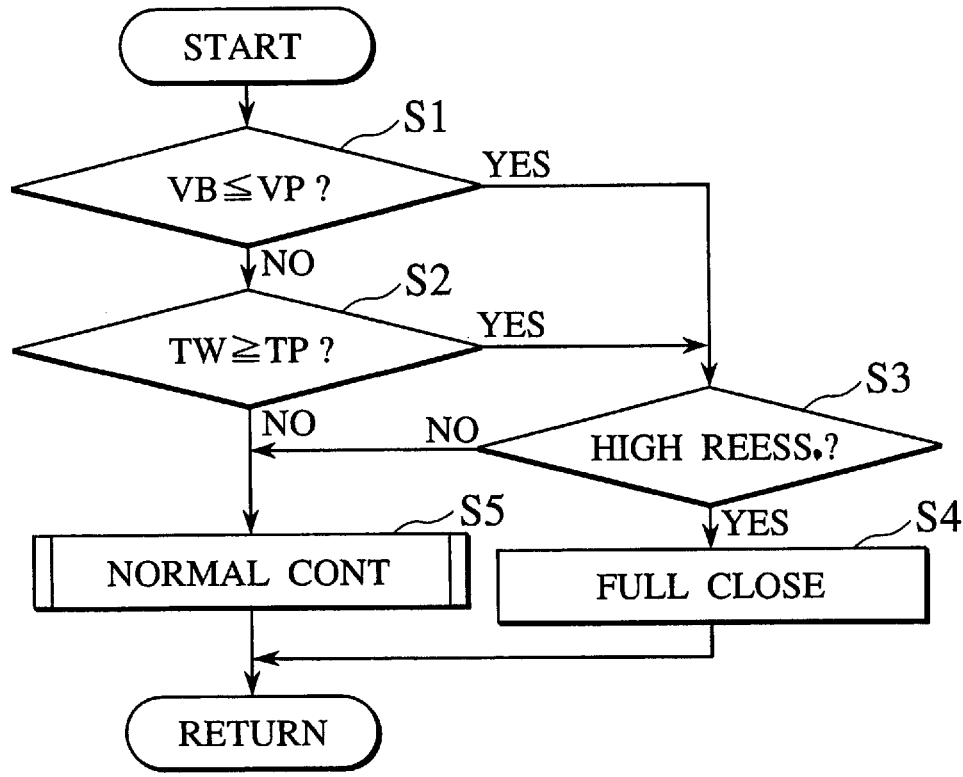
FIG. 3 shows a flow chart of a process performed by the control unit according to the embodiment.

In the meanwhile, more specifically, the control unit 9 performs such a process for controlling the EGR valve 1 as shown in FIG. 3 at the time of starting the engine 1. Such process is executed every prescribed time interval, for example, every one rotation of the engine from the time when an ignition key has been made "ON" until the time when this ignition key has been made "OFF".

At first, in step 1 (S1), it is determined in the battery voltage determining block B1 whether the battery voltage VB is not higher than a prescribed battery voltage VP, for example, 9 V. When in step 1 (S1) it has been determined that the battery voltage VB is not higher than the prescribed battery voltage VP, the flow proceeds to step 3 (S3). On the other hand, when it has been determined that the battery voltage VB is a high voltage that is higher than the prescribed battery voltage VP, the flow proceeds to step 2 (S2).

Where the process has proceeded to step 2 (S2), it is determined in the water temperature determining block B2 whether the water temperature TW is not lower than a prescribed water temperature TP, for example, 95° C. When in step 2 (S2) it has been determined that the water temperature TW is a high temperature that is not lower than the prescribed water temperature TP, the flow similarly proceeds to step 3 (S3). On the other hand, when it has been determined that the water temperature TW is a low temperature that is lower than the prescribed water temperature TP, the process proceeds to step 5 (S5).

Where the process has proceeded to step 5 (S5) in this way, this case corresponds to a case where the battery voltage VB is a high voltage and the water temperature TW is a low temperature, namely, a case where, since the electricity supplied to the step motor 8 is not deficient and the drive force applied from the step motor 8 to the valve body 6 is also not deficient and as a result no step out occurs in the step motor, the valve body 6 has been determined as being able to sufficiently resist the exhaust gas pressure of the engine E. Therefore, in step 5 (S5), the control of the EGR valve 1 as at a normal time control is performed during a prescribed time period. Specifically, the control unit 9 drives the step motor 8 so as to realize a predetermined EGR rate in correspondence with the engine rotations number NE and the engine load, for example, injecting quantity of fuel QF, thereby controlling the degree of opening of the EGR valve 1. And the present process is terminated.

On the other hand, when the process has proceeded to step 3 (S3), this case corresponds to a case where the battery voltage VB is a low voltage or the water temperature TW is a high temperature, namely, a case where the quantity of electricity supplied to the step motor 8 has been determined as being deficient. Therefore, in this case, it is necessary to determine whether the drive force applied to the valve body 6 from the step motor 8 is deficient, namely, whether the valve body 6 can resist the exhaust gas pressure of the engine E.

Figure 4:
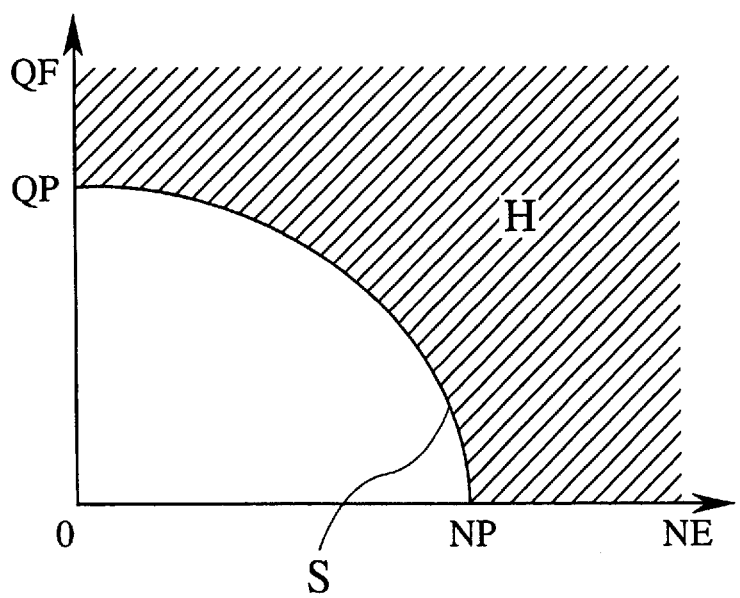
FIG. 4 shows a map that is used in the process of the control unit according to the embodiment.

In this embodiment, since even when the quantity of electricity supplied to the step motor 8 is deficient, namely, even when the drive force applied to the valve body 6 from the step motor 8 decreases, when the exhaust gas pressure of the engine E is low, the valve body 6 can resist the exhaust gas pressure of the engine E, so therefore, such determination in step 3 (S3) is made so as to further consider the exhaust gas pressure PE of the engine E. More specifically, to this end, a map that was previously stored in a memory (not shown) provided within the control unit 9 is used. The map is illustrated in FIG. 4. As is understood by referring to FIG. 4, this map has a curve S, with respect to the engine rotations number NE and the injecting quantity of fuel QF corresponding to the engine load, that is prepared by connecting a threshold value QP of the injecting quantity QF of fuel at the time when the engine rotations number NE is 0 and a threshold value NP of the engine rotations number NE at the time when the injecting quantity of fuel QF is 0. More specifically, this curve S is determined by sequentially obtaining the engine rotations number NE and the injecting quantity of fuel QF mated therewith when the step out occurs in the step motor 8 due to the case that the valve body 6 can not resist the exhaust gas pressure of the engine E and then smoothly connecting adjacent two mated-value sets of the engine rotations number NE and the injecting quantity of fuel QF respectively obtained in such a manner. And, in this step, by confirming whether a set of the detected engine rotations number NE and detected injecting quantity of fuel QF falls onto the curve S itself of the map illustrated in FIG. 4 or within an upper region situated upwardly therefrom, it is determined whether the exhaust gas pressure PE of the engine E is within a high exhaust gas pressure region H, namely, is as high as that at which the step out occurs in the step motor 8. Where in this step it is determined that the exhaust gas pressure PE of the engine E is within the high exhaust gas pressure region H, the process proceeds to step 4 (S4). On the other hand, where it is determined that the exhaust gas pressure PE of the engine E is not within the high exhaust pressure range H, the process proceeds to step 5 (S5) because this case is one where no step out occurs in the step motor 8. And the control of the EGR valve 1 is performed as at a normal time, after which the present process is terminated. It is to be noted that the process in step 3 (S3) is performed in the exhaust gas pressure determining block B3.

Where the process has proceeded to step 4 (S4), since this case is one where it is considered that the step out occurs in the step motor 8, the forcedly fully closing block B4 supplies to the step motor 8 a control signal C indicating the operation for forcedly fully closing the EGR valve 1, thereby fully closing the EGR valve 1 compulsively. At such time of fully closing the valve body 6, since the exhaust gas pressure of the engine E acts in the direction of closing the valve body 6, the step out can be effectively prevented from occurring in the step motor.

As described above, in this embodiment, in a case where the battery voltage is decreased due to, for example, the deterioration of the battery with the passage of time, or in a case where the temperature of the cooling water of the engine E is high, for example, as the vehicle is ascending a slope, the determination of whether the drive force for the step motor used to maintain the valve body of the EGR valve 1 is deficient due to the deficiency in the coil current resulting from the decrease in the quantity of electricity to the step motor, namely the determination of whether the step out occurs in the step motor, is done by considering the exhaust gas pressure of the engine as well. Also, the exhaust gas pressure of the engine is detected from the engine rotations number and the engine load, and, the above condition is satisfied and only when such exhaust gas pressure of the engine is as high as that which causes a step out to occur in the step motor, the EGR valve is made to be forcedly fully closed.

With the above-described structure, according to this embodiment, it is possible, while maximally ensuring the ordinary operation of the EGR, to reliably prevent a step out from occurring in the step motor only when necessary, with a simple and convenient structure and without providing additional detectors.

Additionally, although in this embodiment in step 3 (S3) the exhaust gas pressure PE is detected indirectly from the engine rotations number NE and injecting quantity of fuel QF from the viewpoint of using various kinds of conventionally existing detectors, the exhaust gas pressure PE may be detected directly by providing an exhaust gas pressure sensor 15. In this case, the map such as that illustrated in FIG. 4 is not necessary, and it is determined whether the exhaust gas pressure PE is equal to or higher than a prescribed threshold value PP generating the step out in the step motor.

Also, the threshold value VP of the battery voltage VB in step 1 (S1), the threshold value TP of the water temperature TW of the cooling water of the engine E in step 2 (S2), the curve S in step 3 (S3), and, as the occasion demands, the threshold value PP of the exhaust gas pressure PE may each be plurality prepared and used. For example, saying about the battery voltage VB, a first threshold value VP1 and second threshold value VP2 (<VP1) may be prepared and, where the battery voltage is not higher than the first threshold value VP1, an ordinary control of the EGR may be executed for a prescribed period of time. And, where the battery voltage is higher than the first threshold value VP1 and not higher than the second threshold value VP2, the EGR valve may be fully closed. Also, saying about the water temperature TW, a first threshold value TP1 and second threshold value TP2 (>TP1) may be prepared and, where the water temperature is not lower than the first threshold value TP1 and lower than the second threshold value TP2, an ordinary control of the EGR may be executed for a prescribed period of time. And where the water temperature is not lower than the second threshold value TP2, the EGR valve may be fully closed. Also, saying about the curve S, a first threshold value S1 and second threshold value S2 (that is situated upwardly from the curve S1) may be prepared and, where the exhaust gas pressure is on a side upper than the first curve S1 and lower than the second curve S2, an ordinary control of the EGR may be executed for a prescribed period of time. And where the exhaust gas pressure is on a side upper than the second curve S2, the EGR valve may be fully closed.

Also, although in step 3 (S3) the injecting quantity of fuel QF is made to correspond to the engine load, the invention is of course not limited thereto. The engine load may be determined from an accelerator opening, or the like.

The entire contents of a Patent Application No. TOKUGANHEI 10-191998, with a filing date of Jul. 7, 1998 in Japan, are hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. An apparatus controlling an EGR valve of a diesel engine, said EGR valve being provided in an EGR passage that recirculats a part of an exhaust gas in an exhaust passage of said diesel engine so as to return said a part of said exhaust gas to an inlet passage thereof and including a valve body, a valve seat, and a step motor that fully closes said EGR passage by moving said valve body so as to abut onto said valve seat and that opens said EGR passage by moving said valve body away from said valve seat, said valve body being located on a side of said exhaust passage as viewed from said valve seat, said apparatus comprising:

a battery voltage determining section determining whether a voltage of a battery connected to said step motor is not higher than a predetermined voltage;

a water temperature determining section determining whether a temperature of a cooling water of said diesel engine is not lower than a predetermined temperature;

an exhaust gas pressure determining section determining whether an exhaust gas pressure of said diesel engine is in a state corresponding to a predetermined pressure or a pressure higher than said predetermined pressure; and a forcedly fully closing section forcedly fully closing said EGR valve when it is determined in said battery voltage determining section that said voltage of said battery is not higher than said predetermined voltage, and/or it is determined in said water temperature determining section that said temperature of said cooling water of said diesel engine is not lower than said predetermined temperature, and it is determined in said exhaust gas pressure determining section that said exhaust gas pressure of said diesel engine is in said state corresponding to said predetermined pressure or said pressure higher than said predetermined pressure.

2. An apparatus controlling an EGR valve of a diesel engine according to claim 1 wherein said exhaust gas pressure determining section determines based on a rotations number of said diesel engine and a load of said diesel engine whether said exhaust gas pressure of said diesel engine is in said state corresponding to said predetermined pressure or said pressure higher than said predetermined pressure.

3. An apparatus controlling an EGR valve of a diesel engine according to claim 2, wherein in said exhaust gas pressure determining section, an fuel injection quantity of said diesel engine is made to correspond to said load of said diesel engine.

4. An apparatus controlling an EGR valve of a diesel engine according to claim 3, wherein said exhaust gas pressure determining section uses a map including said rotations number of said diesel engine and said fuel injection quantity of said diesel engine, and determines that said exhaust gas pressure is in said state corresponding to said predetermined pressure or said pressure higher than said predetermined pressure when a set of said rotations number and said fuel injection quantity mated therewith are in a region of a high exhaust gas pressure in said map.

5. An apparatus controlling an EGR valve of a diesel engine according to claim 1, wherein said exhaust gas pressure determining section determines whether said exhaust gas pressure of said diesel engine is at said predetermined pressure or said pressure higher than said predetermined pressure.

6. An apparatus controlling an EGR valve of a diesel engine, said EGR valve being provided in an EGR passage that recirculats a part of an exhaust gas in an exhaust passage of said diesel engine so as to return said a part of said exhaust gas to an inlet passage thereof and including a valve body, a valve seat, and a step motor that fully closes said EGR passage by moving said valve body so as to abut onto said valve seat and that opens said EGR passage by moving said valve body away from said valve seat, said valve body being located on a side of said exhaust passage as viewed from said valve seat, said apparatus comprising:

battery voltage determining means for determining whether a voltage of a battery connected to said step motor is relatively low;

water temperature determining means for determining whether a temperature of a cooling water of said diesel engine is relatively high;

exhaust gas pressure determining means for determining whether an exhaust gas pressure of said diesel engine is at a relatively high level; and forcedly fully closing means that forcedly fully closes said EGR valve when it is determined in said battery voltage determining means that said voltage of said battery is relatively low, and/or it is determined in said water temperature determining means that said temperature of said cooling water of said diesel engine is relatively high, and it is determined in said exhaust gas pressure determining means that said exhaust gas pressure of said diesel engine is at said relatively high level.

7. A method of controlling an EGR valve of a diesel engine, said EGR valve being provided in an EGR passage that recirculats a part of an exhaust gas in an exhaust passage of said diesel engine so as to return said a part of said exhaust gas to an inlet passage thereof and including a valve body, a valve seat, and a step motor that fully closes said EGR passage by moving said valve body so as to abut onto said valve seat and that opens said EGR passage by moving said valve body away from said valve seat, said valve body being located on a side of said exhaust passage as viewed from said valve seat, said method comprising:

determining whether a voltage of a battery connected to said step motor is relatively low;

determining whether a temperature of a cooling water of said diesel engine is relatively high;

determining whether an exhaust gas pressure of said diesel engine is at a relatively high level; and forcedly fully closing said EGR valve when it is determined that said voltage of said battery is relatively low, and/or it is determined that said temperature of said cooling water of said diesel engine is relatively high, and it is determined that said exhaust gas pressure of said diesel engine is at said relatively high level.

* * * * *